(12) United States Patent
Abrams

(10) Patent No.: US 7,632,371 B2
(45) Date of Patent: *Dec. 15, 2009

(54) FLOCKED TRANSFER AND ARTICLE OF MANUFACTURE INCLUDING THE APPLICATION OF THE TRANSFER BY THERMOPLASTIC POLYMER FILM

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/876,524

(22) Filed: Oct. 22, 2007

(65) Prior Publication Data

US 2008/0113144 A1    May 15, 2008

Related U.S. Application Data

(60) Continuation of application No. 10/455,575, filed on Jun. 4, 2003, now Pat. No. 7,381,284, which is a division of application No. 09/735,721, filed on Dec. 13, 2000, now Pat. No. 7,364,782, which is a continuation-in-part of application No. 09/621,830, filed on Jul. 24, 2000, now Pat. No. 7,344,769.

(51) Int. Cl.
    B29C 65/02    (2006.01)
    B32B 37/04    (2006.01)
    B32B 37/16    (2006.01)
    B32B 38/00    (2006.01)
    B44C 1/165    (2006.01)
    B44C 1/17     (2006.01)

(52) U.S. Cl. ........................ 156/155; 156/230; 156/238; 156/240; 156/247; 156/250

(58) Field of Classification Search ................. 156/230, 156/247, 250, 253, 256, 263, 267, 269, 308.2, 156/308.6, 309.9, 155, 238–241, 166, 171, 156/231, 234, 289, 307.1, 309.6; 428/295.1, 428/295.4, 297.1, 297.4, 298.1, 300.7, 346, 428/352, 542.6; 427/146, 148
See application file for complete search history.

(56) References Cited

U.S. PATENT DOCUMENTS

D66,035 S    11/1924    McIntosh (Continued)

FOREIGN PATENT DOCUMENTS

BE        0506601      3/1996

(Continued)

OTHER PUBLICATIONS

English Abstract of JP 04-169297.*

(Continued)

*Primary Examiner*—Philip C Tucker
*Assistant Examiner*—Sing P Chan
(74) *Attorney, Agent, or Firm*—Sheridan Ross, P.C.

(57) ABSTRACT

A flocked transfer is produced by applying a release agent to a release sheet, and then applying the flocking to a release agent. Unlike the traditional method, a binder and thermoplastic hot melt film is applied to the back of the flock. The transfer, which is essentially release sheet, is then applied to a substrate, such as item of clothing, a rubber pad, etc., by positioning a sheet of thermoplastic hot melt film on the substrate; placing the transfer on the hot melt with the flock in contact with the hot melt film, and applying heat and pressure. The heat melts the thermoplastic hot melt film to bind the flock to the substrate and binds the flocking together. This method reduces the cost involved in producing flocked articles, especially for articles produced on a continuous basis.

30 Claims, 3 Drawing Sheets

U.S. PATENT DOCUMENTS

| | | |
|---|---|---|
| 1,580,717 A | 4/1926 | Flick |
| 1,905,989 A | 4/1933 | Safir et al. |
| 1,975,542 A | 10/1934 | Forsdale |
| 1,992,676 A | 2/1935 | Schwarz |
| 2,047,978 A | 7/1936 | Maclaurin |
| D108,581 S | 2/1938 | Robinson |
| D114,814 S | 5/1939 | Hoos |
| D122,192 S | 8/1940 | De Moreau |
| D125,860 S | 3/1941 | Haas |
| 2,275,617 A | 3/1942 | Duerr et al. |
| 2,278,227 A | 3/1942 | Thackeray et al. |
| 2,477,912 A | 8/1949 | Vallandigham |
| D162,533 S | 3/1951 | Goldfarb |
| 2,636,837 A | 4/1953 | Summers |
| 2,835,576 A | 5/1958 | Ensink |
| 2,916,403 A | 12/1959 | Calderwood |
| 2,981,588 A | 4/1961 | Hyman |
| 2,999,763 A | 9/1961 | Sommer |
| D195,245 S | 5/1963 | Edesess |
| 3,099,514 A | 7/1963 | Haber |
| 3,215,584 A | 11/1965 | McConnell et al. |
| 3,314,845 A | 4/1967 | Perri |
| 3,351,479 A | 11/1967 | Fairchild |
| 3,377,232 A | 4/1968 | Mencock et al. |
| 3,432,446 A | 3/1969 | Coppeta |
| 3,459,579 A | 8/1969 | Newman |
| 3,496,054 A | 2/1970 | Baigas |
| 3,529,986 A | 9/1970 | Kappas et al. |
| 3,565,742 A | 2/1971 | Stephens et al. |
| 3,591,401 A | 7/1971 | Snyder et al. |
| 3,622,434 A | 11/1971 | Newman |
| 3,639,149 A | 2/1972 | Spalding |
| 3,644,267 A | 2/1972 | Jackson, Jr. et al. |
| 3,657,060 A | 4/1972 | Haigh |
| 3,660,200 A | 5/1972 | Anderson et al. |
| 3,674,611 A | 7/1972 | Petry et al. |
| 3,772,132 A | 11/1973 | Dulin, Jr. |
| 3,775,205 A | 11/1973 | Hermann et al. |
| 3,793,050 A | 2/1974 | Mumpower, Jr. |
| 3,803,453 A | 4/1974 | Hull |
| 3,816,060 A | 6/1974 | Koskolos |
| 3,816,211 A | 6/1974 | Haigh |
| 3,837,946 A | 9/1974 | Gribbin |
| 3,887,737 A | 6/1975 | Baxter et al. |
| 3,900,676 A | 8/1975 | Alderson |
| 3,903,331 A | 9/1975 | Klein |
| 3,917,883 A | 11/1975 | Jepson |
| 3,918,895 A | 11/1975 | Mizuno |
| 3,928,706 A | 12/1975 | Gibbons |
| 3,936,554 A | 2/1976 | Squier |
| 3,956,552 A | 5/1976 | Geary |
| 3,961,116 A | 6/1976 | Klein |
| 3,969,559 A | 7/1976 | Boe |
| 3,979,538 A | 9/1976 | Gilman et al. |
| 3,989,869 A | 11/1976 | Neumaier et al. |
| 4,018,956 A | 4/1977 | Casey |
| 4,025,678 A | 5/1977 | Frank |
| 4,031,281 A | 6/1977 | Keeling |
| 4,034,134 A | 7/1977 | Gregorian et al. |
| 4,035,532 A | 7/1977 | Gregorian et al. |
| 4,062,992 A | 12/1977 | Power et al. |
| 4,088,708 A | 5/1978 | Riew |
| 4,102,562 A | 7/1978 | Harper et al. |
| 4,120,713 A | 10/1978 | Jensen et al. |
| 4,142,929 A | 3/1979 | Otomine et al. |
| 4,160,851 A | 7/1979 | Lienert et al. |
| 4,201,810 A | 5/1980 | Higashiguchi |
| 4,218,501 A | 8/1980 | Kameya et al. |
| 4,238,190 A | 12/1980 | Rejto |
| 4,263,373 A | 4/1981 | Mccaskey et al. |
| 4,269,885 A | 5/1981 | Mahn |
| 4,273,817 A | 6/1981 | Matsuo et al. |
| 4,282,278 A | 8/1981 | Higashiguchi |
| 4,292,100 A | 9/1981 | Higashiguchi |
| 4,294,577 A | 10/1981 | Bernard |
| 4,294,641 A | 10/1981 | Reed et al. |
| 4,308,296 A | 12/1981 | Chitouras |
| 4,314,813 A | 2/1982 | Maskai |
| 4,314,955 A | 2/1982 | Boden et al. |
| 4,319,942 A | 3/1982 | Brenner |
| 4,340,623 A | 7/1982 | Justus |
| 4,340,632 A | 7/1982 | Wells et al. |
| 4,352,924 A | 10/1982 | Wooten et al. |
| 4,362,773 A | 12/1982 | Shikinami |
| 4,369,157 A | 1/1983 | Conner |
| 4,370,374 A | 1/1983 | Raabe et al. |
| 4,385,588 A | 5/1983 | Bennetot |
| 4,387,214 A | 6/1983 | Passmore et al. |
| 4,388,134 A | 6/1983 | Long et al. |
| 4,390,387 A | 6/1983 | Mahn |
| 4,396,662 A | 8/1983 | Higashiguchi |
| 4,405,401 A | 9/1983 | Stahl |
| 4,413,019 A | 11/1983 | Brenner |
| 4,418,106 A | 11/1983 | Landler et al. |
| 4,423,106 A | 12/1983 | Mahn |
| 4,430,372 A | 2/1984 | Knoke et al. |
| 4,438,533 A | 3/1984 | Hefele |
| 4,446,274 A | 5/1984 | Okazaki et al. |
| 4,465,723 A | 8/1984 | Knoke et al. |
| 4,510,274 A | 4/1985 | Okazaki et al. |
| 4,539,166 A | 9/1985 | Richartz et al. |
| 4,574,018 A | 3/1986 | Masuda et al. |
| 4,582,658 A | 4/1986 | Reichmann et al. |
| 4,588,629 A | 5/1986 | Taylor |
| 4,610,904 A | 9/1986 | Mahn, Sr. et al. |
| 4,650,533 A | 3/1987 | Parker et al. |
| 4,652,478 A | 3/1987 | Maii |
| 4,668,323 A | 5/1987 | Lenards et al. |
| 4,670,089 A | 6/1987 | Hanson |
| 4,681,791 A | 7/1987 | Shibahashi et al. |
| 4,687,527 A | 8/1987 | Higashiguchi |
| 4,741,791 A | 5/1988 | Howard et al. |
| 4,790,306 A | 12/1988 | Braun et al. |
| 4,793,884 A | 12/1988 | Horikiri |
| 4,797,320 A | 1/1989 | Kopp et al. |
| 4,810,321 A | 3/1989 | Wank et al. |
| 4,810,549 A | 3/1989 | Abrams et al. |
| 4,812,247 A | 3/1989 | Fahner et al. |
| 4,834,502 A | 5/1989 | Bristol et al. |
| 4,895,748 A | 1/1990 | Squires |
| 4,923,848 A | 5/1990 | Akada et al. |
| 4,931,125 A | 6/1990 | Volkmann et al. |
| 4,980,216 A | 12/1990 | Rompp |
| 5,008,130 A | 4/1991 | Lenards |
| 5,009,950 A | 4/1991 | Wagner et al. |
| 5,026,591 A | 6/1991 | Henn et al. |
| 5,041,104 A | 8/1991 | Seal |
| 5,043,375 A | 8/1991 | Henning et al. |
| 5,047,103 A | 9/1991 | Abrams et al. |
| 5,053,179 A | 10/1991 | Masui et al. |
| 5,059,452 A | 10/1991 | Squires |
| 5,077,116 A | 12/1991 | Lefkowitz |
| 5,108,530 A | 4/1992 | Niebling, Jr. et al. |
| 5,112,423 A | 5/1992 | Liebe, Jr. |
| 5,115,104 A | 5/1992 | Bunyan |
| 5,126,182 A | 6/1992 | Lumb et al. |
| 5,154,871 A | 10/1992 | Wagner et al. |
| 5,155,163 A | 10/1992 | Abeywardena et al. |
| 5,198,277 A | 3/1993 | Hamilton et al. |
| 5,207,851 A | 5/1993 | Abrams |
| 5,217,563 A | 6/1993 | Niebling et al. |
| 5,217,781 A | 6/1993 | Kuipers |
| 5,248,536 A | 9/1993 | Du Katz |
| 5,274,039 A | 12/1993 | Sirinyan et al. |

| | | | | | | |
|---|---|---|---|---|---|---|
| 5,298,031 | A | 3/1994 | Gabay et al. | 7,393,516 B2 | 7/2008 | Seo et al. |
| 5,306,567 | A | 4/1994 | Kuo et al. | 7,393,576 B2 | 7/2008 | Abrams |
| 5,338,603 | A * | 8/1994 | Mahn et al. ............... 428/349 | 7,402,222 B2 | 7/2008 | Abrams |
| 5,346,746 | A | 9/1994 | Abrams | 7,410,682 B2 | 8/2008 | Abrams |
| 5,350,474 | A | 9/1994 | Yamane | 7,413,581 B2 | 8/2008 | Abrams |
| 5,350,830 | A | 9/1994 | Kuo et al. | 7,461,444 B2 | 12/2008 | Deaett et al. |
| 5,358,789 | A | 10/1994 | Kuo et al. | 2001/0008039 A1 | 7/2001 | Alboom et al. |
| 5,383,996 | A | 1/1995 | Dressler | 2001/0008672 A1 | 7/2001 | Norvell et al. |
| 5,403,884 | A | 4/1995 | Perlinski | 2002/0098329 A1 | 7/2002 | Abrams |
| D365,342 | S | 12/1995 | Evenson et al. | 2003/0129353 A1 | 7/2003 | Abrams |
| D366,654 | S | 1/1996 | Lovegrove et al. | 2004/0010093 A1 | 1/2004 | Wefringhaus et al. |
| 5,489,359 | A | 2/1996 | Yamane | 2004/0033334 A1 | 2/2004 | Merovitz |
| 5,529,650 | A | 6/1996 | Bowers et al. | 2004/0050482 A1 | 3/2004 | Abrams |
| 5,534,099 | A | 7/1996 | Yamamoto | 2004/0170799 A1 | 9/2004 | Carr et al. |
| 5,543,195 | A | 8/1996 | Squires et al. | 2005/0081985 A1 | 4/2005 | Abrams |
| 5,564,249 | A | 10/1996 | Borys et al. | 2005/0158508 A1 | 7/2005 | Abrams |
| 5,597,633 | A | 1/1997 | Mecke et al. | 2005/0260378 A1 | 11/2005 | Bernabeu |
| 5,597,637 | A | 1/1997 | Abrams et al. | 2005/0268407 A1 | 12/2005 | Abrams |
| 5,622,587 | A | 4/1997 | Barthelman | 2006/0026778 A1 | 2/2006 | Lion |
| 5,685,223 | A | 11/1997 | Vermuelen et al. | 2006/0029767 A1 | 2/2006 | Lion |
| 5,693,400 | A | 12/1997 | Hamilton et al. | 2006/0142405 A1 | 6/2006 | Kijima |
| D391,572 | S | 3/1998 | Lee | 2006/0251852 A1 | 11/2006 | Abrams |
| 5,756,180 | A | 5/1998 | Squires et al. | 2006/0257618 A1 | 11/2006 | Pascual Bernabeu |
| 5,762,379 | A | 6/1998 | Salmon et al. | 2007/0003761 A1 | 1/2007 | Miyazono et al. |
| 5,766,397 | A | 6/1998 | Jones | 2007/0022548 A1 | 2/2007 | Abrams |
| 5,771,796 | A | 6/1998 | Morrison et al. | 2007/0026189 A1 | 2/2007 | Abrams |
| 5,804,007 | A | 9/1998 | Asano | 2007/0102093 A1 | 5/2007 | Abrams |
| 5,858,156 | A | 1/1999 | Abrams et al. | 2007/0110949 A1 | 5/2007 | Abrams |
| 5,863,633 | A | 1/1999 | Squires et al. | 2007/0148397 A1 | 6/2007 | Abrams |
| 5,900,096 | A | 5/1999 | Zemel | 2007/0289688 A1 | 12/2007 | Abrams |
| 5,912,065 | A | 6/1999 | Kukoff | 2008/0003399 A1 | 1/2008 | Abrams |
| 5,922,436 | A | 7/1999 | Banfield et al. | 2008/0006968 A1 | 1/2008 | Abrams |
| 5,981,009 | A | 11/1999 | Iacono et al. | 2008/0050548 A1 | 2/2008 | Abrams |
| 6,010,764 | A | 1/2000 | Abrams | 2008/0095973 A1 | 4/2008 | Abrams |
| 6,083,332 | A | 7/2000 | Abrams | 2008/0102239 A1 | 5/2008 | Abrams |
| 6,102,686 | A | 8/2000 | Eschenfelder | 2008/0111047 A1 | 5/2008 | Abrams |
| 6,110,560 | A | 8/2000 | Abrams | 2008/0124503 A1 | 5/2008 | Abrams |
| 6,113,149 | A | 9/2000 | Dukatz | 2008/0145585 A1 | 6/2008 | Abrams |
| 6,146,485 | A | 11/2000 | Iacono et al. | 2008/0150186 A1 | 6/2008 | Abrams |
| 6,170,881 | B1 | 1/2001 | Salmon et al. | 2008/0187706 A1 | 8/2008 | Lion et al. |
| 6,171,678 | B1 | 1/2001 | Holeschovsky et al. | | | |
| 6,178,680 | B1 | 1/2001 | Sloot | | | |
| 6,202,549 | B1 | 3/2001 | Mitsam et al. | | | |

FOREIGN PATENT DOCUMENTS

| | | |
|---|---|---|
| CA | 757595 | 4/1967 |
| CA | 2010076 | 8/1990 |
| CA | 1306411 | 8/1992 |
| CA | 2064300 | 9/1992 |
| DE | 3004560 | 8/1981 |
| DE | 202835 | 10/1983 |
| DE | 3883517 | 5/1994 |
| DE | 69208910 | 8/1996 |
| DE | 19707381 | 8/1998 |
| DE | 19734316 | 2/1999 |
| DK | 0506601 | 5/1996 |
| EP | 0122656 | 10/1984 |
| EP | 0210304 | 2/1987 |
| EP | 0280296 | 8/1988 |
| EP | 0351079 | 1/1990 |
| EP | 0506601 | 9/1992 |
| EP | 0685014 | 12/1995 |
| EP | 0913271 | 10/1998 |
| EP | 0989227 | 3/2000 |
| EP | 1072712 | 1/2001 |
| EP | 1598463 | 11/2005 |
| FR | 1480860 | 5/1967 |
| FR | 2210149 | 7/1974 |
| FR | 2543984 | 10/1984 |
| FR | 2659094 | 9/1991 |
| FR | 2784619 | 4/2000 |
| FR | 2846202 | 4/2004 |
| FR | 2881149 | 7/2006 |
| GB | 1171296 | 11/1969 |
| GB | 1447049 | 8/1976 |

| | | | |
|---|---|---|---|
| 6,224,707 | B1 * | 5/2001 | Lion ........................ 156/230 |
| 6,247,215 | B1 | 6/2001 | Van Alboom et al. |
| 6,249,297 | B1 | 6/2001 | Lion |
| 6,257,866 | B1 | 7/2001 | Fritz et al. |
| 6,264,775 | B1 | 7/2001 | Holeschovsky et al. |
| 6,277,312 | B1 | 8/2001 | Hansen et al. |
| 6,296,908 | B1 | 10/2001 | Reihs et al. |
| 6,299,715 | B1 | 10/2001 | Langsdorf et al. |
| 6,350,504 | B1 | 2/2002 | Alboom et al. |
| 6,361,855 | B2 | 3/2002 | Mahn, Jr. et al. |
| 6,376,041 | B1 | 4/2002 | Morrison et al. |
| 6,387,472 | B1 | 5/2002 | Reck et al. |
| 6,428,877 | B1 | 8/2002 | Suss et al. |
| 6,436,506 | B1 | 8/2002 | Pinter et al. |
| 6,451,148 | B1 | 9/2002 | Jenner |
| 6,569,538 | B1 | 5/2003 | Kaschel |
| 6,660,352 | B2 | 12/2003 | Hsu et al. |
| 6,676,796 | B2 | 1/2004 | Pinter et al. |
| 6,774,067 | B2 | 8/2004 | Demott et al. |
| 6,924,000 | B2 | 8/2005 | Tallmadge |
| 6,929,771 | B1 | 8/2005 | Abrams |
| 6,977,023 | B2 | 12/2005 | Abrams |
| 7,135,518 | B2 | 11/2006 | Bandou et al. |
| 7,229,680 | B1 | 6/2007 | Crompton |
| 7,338,697 | B2 | 3/2008 | Abrams |
| 7,344,769 | B1 | 3/2008 | Abrams |
| 7,351,368 | B2 | 4/2008 | Abrams |
| 7,364,782 | B2 | 4/2008 | Abrams |
| 7,381,284 | B2 * | 6/2008 | Abrams .................. 156/155 |
| 7,390,552 | B2 | 6/2008 | Abrams |

| | | |
|---|---|---|
| GB | 1466271 | 3/1977 |
| GB | 2065031 | 6/1981 |
| GB | 2101932 | 1/1983 |
| GB | 2126951 | 4/1984 |
| GB | 2214869 | 9/1989 |
| GB | 0506601 | 9/1992 |
| IE | 55104 | 10/1984 |
| JP | 71007184 | 6/1965 |
| JP | 52-155270 | 12/1977 |
| JP | 54-163934 | 12/1979 |
| JP | 55079143 | 6/1980 |
| JP | 55-147171 | 11/1980 |
| JP | 56058824 | 5/1981 |
| JP | 56107080 | 8/1981 |
| JP | 56108565 | 8/1981 |
| JP | 56141877 | 11/1981 |
| JP | 58062027 | 4/1983 |
| JP | 59115885 | 7/1984 |
| JP | 60-171138 | 9/1985 |
| JP | 60-236738 | 11/1985 |
| JP | S61-146368 | 7/1986 |
| JP | 62-033576 | 2/1987 |
| JP | 63118544 | 5/1988 |
| JP | 64-014021 | 1/1989 |
| JP | 64-61299 | 3/1989 |
| JP | S64-068582 | 3/1989 |
| JP | 01192538 | 8/1989 |
| JP | 01-266284 | 10/1989 |
| JP | 01-310947 | 12/1989 |
| JP | 02048076 | 2/1990 |
| JP | 2-25667 | 6/1990 |
| JP | 04-126221 | 4/1992 |
| JP | 04169297 A * | 6/1992 |
| JP | 5-201196 | 8/1993 |
| JP | 05255021 | 10/1993 |
| JP | 08-267625 | 10/1996 |
| JP | 10059790 | 3/1998 |
| JP | 11256484 | 9/1999 |
| JP | 11277662 | 10/1999 |
| JP | 11348159 | 12/1999 |
| JP | 2000084977 | 3/2000 |
| JP | 2000-094563 | 4/2000 |
| JP | 2000-208564 | 7/2000 |
| JP | 2000263673 | 9/2000 |
| JP | 2001270019 | 10/2001 |
| KR | 220373 | 9/1999 |
| KR | 2003063833 | 7/2003 |
| NO | 306099 | 6/1989 |
| WO | WO 79/01146 | 12/1979 |
| WO | WO 89/01829 | 3/1989 |
| WO | WO 90/09289 | 8/1990 |
| WO | WO 92/04502 | 3/1992 |
| WO | WO 93/12283 | 6/1993 |
| WO | WO 94/19530 | 9/1994 |
| WO | WO 97/34507 | 9/1997 |
| WO | WO 02/07959 | 1/2002 |
| WO | WO 02/09925 | 2/2002 |
| WO | WO 02/058854 | 8/2002 |
| WO | WO 03/031083 | 4/2003 |
| WO | WO 2004/005023 | 1/2004 |
| WO | WO 2004/005413 | 1/2004 |
| WO | WO 2004/005600 | 1/2004 |
| WO | WO 2005/035235 | 4/2005 |
| WO | WO 2005/118948 | 12/2005 |
| ZA | 88/6259 | 4/1990 |
| ZA | 92/2154 | 2/1993 |

OTHER PUBLICATIONS

U.S. Appl. No. 29/058,551, filed Aug. 19, 1996, Abrams.
U.S. Appl. No. 09/548,839, filed Apr. 13, 2000, Abrams.
U.S. Appl. No. 11/972,440, filed Jan. 10, 2008, Abrams.
U.S. Appl. No. 12/031,445, filed Feb. 14, 2008, Abrams.
Examiner's Report for Canadian Patent Application No. 2,415,680, mailed Apr. 28, 2008.
Notice of Resaons for Rejection for Korean Patent Application No. 2003-7007897, dated Sep. 18, 2007.
Notice of Resaons for Rejection for Korean Patent Application No. 2003-7007897, dated Mar. 12, 2008.
Notice of Resaons for Rejection for Korean Patent Application No. 2003-7007897, dated Aug. 27, 2008.
"Polymers", Chemistry, Unit 16, date unknonwn, pp. 313-325.
"Flockin' to Precision"; Images Magazine; Feb. 1992, 1 page.
"RMIUG Meeting Minutes—Colorado in the Information Age"; Jan. 14, 1997; 1 page.
"A Rug Fit for a Mouse," Time Magazine (Sep. 28, 1998) p. 96.
"Magic Carpet" Wired Magazine (Nov. 1998), p. 68.
"New pads for computer mice now cutting a different rug," USA Today (Oct. 26, 1998).
"Rugs for Rodents," Newsweek (Nov. 9, 1998), p. 8.
Agion Technologies, LLC., The Most Advanced Antimicrobial Silver Delivery System; (date unknown).
Artisyn Synthetic Paper 165, Printability Product Specification Sheet, Mar. 1999, 2 pages.
Artisyn Synthetic Paper 165, Printability Product Specification Sheet, May 1997, 1 page.
Bayer Plastics Division Press Release, Wheel Covers, Center Caps Become Revolving Art Forms with New Film Insert Molding Technology, Jun. 19, 2000; 4 pages.
Bostik USA; "Industrial Adhesives" (2001), 3 pages.
Bostik USA; Web & Powder Adhesives; 2000; 2 pgs.
Brown Abrams, "Flocking A Touch of Velour" ScreenPrinting (Apr. 1987).
Brown Abrams, "Part II: Flocking" ScreenPrinting (Jun. 1987).
Cellusuede Products, Inc, "About Flock", Available at http://www.cellusuede.com/navabout.html, KMK Media Group, copyright 2000, 1 pages.
Cellusuede Products, Inc, "FAQ's", Available at http://www.cellusuede.com/faq.html, KMK Media Group, copyright 2000, 2 pages.
Cellusuede Products, Inc, "Fiber Types", Available at http://www.cellusuede.com/about/types.html, KMK Media Group, copyright 2000, 4 pages.
Cellusuede Products, Inc, "Glossary of Terms", Available at http://www.cellusuede.com/glossary/index.html, KMK Media Group, copyright 2000, 2 pages.
Cellusuede Products, Inc, "Uses for Flock, Home Furnishings", Available at http://www.cellusuede.com/home.html, KMK Media Group, copyright 2000, 2 pages.
Changpad Trading Inc.; Heat-Trans Pad; Jan. 27, 1999, available at http://www.changpad.com.tw/heat-trans.htm, 1 page.
Computer Current (Nov. 9, 1998).
Defosse; "Systems Approach Gives Blow Molders Big Edge", 2000.
Fake Fur Computer Accessories; Products; Jan. 27, 1999, available at http://workwares.com.au/products.htm, 3 pages.
JC Penney Catalog, Fall & Winter, accent rugs, A-B, p. 1032, 2000 design library (1991).
Landwehr, Rebecca, "When is a mouse pad really a rug?" The Denver Business Journal (Nov. 1998), at http://denverbizjournalscom/denver/stories/1998/11/30/story3html.
Lextra® MouseRug®; "About the Product" (Jan. 27, 1999), http://www.mouserug.com/mouserug/aboutmouserugs.html, 2 pages.
Lextra® MouseRug®; "Dimensions" (Jan. 27, 1999), http://www.mouserug.com/mouserug/mousecomp.html, 1 page.
Lextra® MouseRug®; "MouseRug Components" (Jan. 27, 1999), http://www.mouserug.com/mouserug/mousecomp.html, 1 page.
Sears Catalog, Spring/Summer, bath carpets, (B), fringed oblong, pp. 1290-1291, oreintal design rugs, A-B, p. 1146, 2000 design library (1978).
Shaner, Ken, "Advanced Molding Processes: Low Pressure Molding/Low-High Pressure Molding for Interior Trim," Automotive & Transportation Interior Expo Conference 1997, Session 9, pp. 1-2.
Snyder, Merle R., "Fabric Molding Shows Promise in Automotive: Machine Makers Offer Innovative Systems That Boost Productivity and Facilitate Recyclability," Modern Plastics (Oct. 1999), available at http://www.modplas.com/new/month_1099/ms10.htm.

Sonics & Materials, Inc., "Chart II Compatability of Thermoplastics" (undated), 1 page.

Stahls', New Product Bulletin; 7 pages.

Takatori, Hiroyuki, "Dieprest In-mold Laminate Technology," Automotive & Transportation Interiors Expo Conference 1999, Session 12, pp. 1-4.

Bicomponent Fibers, available at http://web.utk.edu/~mse/pages/Textiles/Bicomponent%20fibers.htm, Updated Apr. 2004, 8 pages.

Background of the Invention for the above-captioned application (previously provided).

Declaration of L. Brown Abrams Under 37 CFR § 1.98 for U.S. Appl. No. 09/735,721, filed Jan. 16, 2004, 2 pages.

Declaration of L. Brown Abrams under 37 CFR § 1.98 for U.S. Appl. No. 09/621,830, filed Jan. 7, 2003, 2 pages.

Declaration of L. Brown Abrams under 37 CFR 1.132 for U.S. Appl. No. 09/735,721, filed Jan. 7, 2003.

Declaration of L. Brown Abrams under 37 CFR § 1.98 for U.S. Appl. No. 09/621,830, filed Jan. 16, 2004, 2 pages.

International Search Report for International Application No. PCT/US01/23195, mailed Oct. 30, 2001.

International Preliminary Examination Report for International Application No. PCT/US01/23195, mailed Jun. 20, 2002.

Examiner's First Report on Australian Patent Application No. 2001280771, mailed Jun. 3, 2005.

Examiner's Report No. 2 on Australian Patent Application No. 2001280771, mailed Jun. 2, 2006.

Examiner's Report for Canadian Patent Application No. 2,415,680, mailed Apr. 17, 2007.

Office Action, Chinese Application No. 01814634.1 from Nov. 18, 2005 (English translation provided).

Supplemental First Office Action, Chinese Application No. 01814634.1 from Dec. 30, 2005.

Rejection Decision for Chinese Application No. 01814634.1, issued Apr. 6, 2007.

JP Office Action (including translation) for Japanese Patent Application No. 2002-513678, dated Apr. 1, 2008.

International Search Report for International Application No. PCT/US01/48615, mailed Jun. 17, 2002.

International Preliminary Examination Report for PCT/US01/48615, mailed Nov. 14, 2003.

Examiner's First Report on Australian Patent Application No. 2002249810, mailed Oct. 20, 2005.

First Office Action (with translation) dated Apr. 1, 2005 for Chinese Patent Application No. 01821885.7, 8 pages.

European Search Report, issued Jan. 12, 2006, in European Patent Application No. 01998050.7.

First Office Action issued Jul. 17, 2006, in European Patent Application No. 01998050.7.

Invitation pursuant to Article 96(2) and Rule 51(2) EPC, dated Jun. 26, 2007, in European Patent Application No. 01998050.7.

JP Office Action (including translation) for 2002-559179, dated Mar. 25, 2008.

Official Action for U.S. Appl. No. 09/621,830, mailed Oct. 8, 2002.
Official Action for U.S. Appl. No. 09/621,830, mailed Oct. 7, 2005.
Official Action for U.S. Appl. No. 09/621,830, mailed Jun. 29, 2006.
Official Action for U.S. Appl. No. 09/621,830, mailed Nov. 15, 2006.
Official Action for U.S. Appl. No. 09/621,830, mailed May 16, 2007.
Notice of Allowance for U.S. Appl. No. 09/621,830, mailed Oct. 2, 2007.

Official Action for U.S. Appl. No. 09/735,721, mailed Oct. 8, 2002.
Official Action for U.S. Appl. No. 09/735,721, mailed Oct. 5, 2005.
Official Action for U.S. Appl. No. 09/735,721, filed Mar. 13, 2006.
Official Action for U.S. Appl. No. 09/735,721, mailed Nov. 15, 2006.
Official Action for U.S. Appl. No. 09/735,721, mailed May 16, 2007.
Notice of Allowance for U.S. Appl. No. 09/735,721, mailed Dec. 12, 2007.

Official Action for U.S. Appl. No. 10/607,091, mailed Oct. 11, 2005.
Official Action for U.S. Appl. No. 10/670,091, mailed Jun. 16, 2006.
Official Action for U.S. Appl. No. 10/670,091, mailed Nov. 2, 2006.
Official Action for U.S. Appl. No. 10/670,091, mailed Feb. 20, 2007.
Official Action for U.S. Appl. No. 10/670,091, mailed Oct. 15, 2007.
Notice of Allowance for U.S. Appl. No. 10/670,091, mailed Feb. 22, 2008.

Official Action for U.S. Appl. No. 10/455,541, mailed Apr. 22, 2005.
Official Action for U.S. Appl. No. 10/455,541, mailed Oct. 27, 2005.
Official Action for U.S. Appl. No. 10/455,541, mailed Apr. 5, 2006.
Official Action for U.S. Appl. No. 10/455,541, mailed Jan. 11, 2007.
Official Action for U.S. Appl. No. 10/455,541, mailed Jun. 25, 2007.
Notice of Allowance for U.S. Appl. No. 10/455,541, mailed Jan. 15, 2008.

Official Action for U.S. Appl. No. 10/455,575, mailed Apr. 28, 2005.
Official Action for U.S. Appl. No. 10/455,575, mailed Oct. 28, 2005.
Official Action for U.S. Appl. No. 10/455,575, filed Mar. 23, 2006.
Official Action for U.S. Appl. No. 10/455,575, mailed Jan. 10, 2007.
Official Action for U.S. Appl. No. 10/455,575, mailed Jun. 20, 2007.
Notice of Allowance for U.S. Appl. No. 10/455,575, mailed Jan. 15, 2008.

Bright, Larry. "Trouble Shooting Continuous Thermosol Dyeing of Polyester Fiber and Blends". American Dyestuff Reporter, Aug. 1996, pp. 60-61.

Notice of Allowance (including translation) for Japanese Patent Application No. 2002-513678, issued Feb. 24, 2009.

Official Action for Canadian Patent Application No. 2,415,680, mailed Jul. 9, 2009.

Notice of Allowance (including translation) for Japanese Patent Application No. 2002-559179, forwarded Sep. 15, 2009.

* cited by examiner

FLOCKED TRANSFER AND ARTICLE OF MANUFACTURE INCLUDING THE APPLICATION OF THE TRANSFER BY THERMOPLASTIC POLYMER FILM

CROSS-REFERENCE TO RELATED APPLICATION

The present application is a continuation of U.S. patent application Ser. No. 10/455,575, filed Jun. 4, 2003, now U.S. Pat. No. 7,381,284 of the same title, which is a divisional patent application of U.S. patent application Ser. No. 09/735,721, filed Dec. 13, 2000, now U.S. Pat. No. 7,364,782 of the same title, which is a continuation-in-part patent application of U.S. patent application Ser. No. 09/621,830, filed Jul. 24, 2000, now U.S. Pat. No. 7,344,769 entitled "FLOCKED TRANSFER AND ARTICLE OF MANUFACTURE INCLUDING THE FLOCKED TRANSFER", each of which is incorporated in its entirety by this reference.

STATEMENT REGARDING FEDERALLY SPONSORED RESEARCH DEVELOPMENT

N/A

BACKGROUND OF THE INVENTION

This invention relates to flocked transfers, and, in particular to an improved method incorporating thermoplastic polymer film, in the making of the flocked transfer, which can reduce the cost and time required of producing transfers by a significant amount.

Heretofore, flocked transfers have generally been produced by applying a release agent to a release sheet. The flocking is applied to the release sheet in the desired pattern. A binder and a permanent hot melt adhesive are applied to the back of the flocking, and the transfer is allowed to dry. The binder is required to hold the flocking in the desired pattern. The hot melt adhesive, which is applied to the transfer as a powder, is used to adhere the transfer to a substrate, such as an article of clothing, a rubber pad, etc. The transfer is applied to the substrate by placing the transfer on the substrate with the dried hot melt adhesive in contact with the substrate. Heat, such as from an iron, is then applied to the release sheet. The heat melts the hot melt adhesive, to cause hot melt adhesive to flow into intimate contact with the substrate, forming a mechanical or physical adhesion with the substrate. The release agent then allows the release sheet to be removed from the transfer, leaving the flocking exposed on the substrate.

This traditional method has worked well for years. However, the method can be improved upon to reduce the cost of producing the transfer, and hence, the cost of the item containing the transfer.

In my co-pending application, I have described the usage of a thermoset film in lieu of the bond and powder for adhesion, which film, when subject to heat, adheres to the substrate, functions as an adherent for the flock. This current invention adds further enhancements to this process, by allowing the application and usage of a thermoplastic film, for adherence of the flock transfer.

BRIEF SUMMARY OF THE INVENTION

In accordance with the invention, generally stated, a flocked transfer of the present invention is produced by applying a release agent to a release sheet, and then applying the flocking to the release agent. Unlike the traditional method, a binder and adhesive are not applied to the ends of the flock, but rather, a thermoplastic polymer film is used in lieu thereof.

To form an article of manufacture with the flocked transfer, a hot melt film (in the form of a sheet are cut to shape) is positioned on the substrate to which the transfer is to be applied. The hot melt is preferably a blank or blank film, but can be any thermoplastic type of polymer film. The flock with the release adhesive and the release sheet (i.e., the transfer) is then placed on the sheet of hot melt film with the release sheet up, so that the flocking is in contact with the hot melt film. Heat is then applied to the transfer. The heat melts the hot melt film, and secures the flock to the substrate. Because the film is thermoplastic, even if it is subsequently subjected to heat, below a particular temperature, it will not remelt, nor become tacky, and hence, there is no risk of the fibers becoming matted down in any of this type of adhesive, which would otherwise ruin the plush pile effect. It is known that there is a enhanced adhesion with thermoplastic materials, because the thermoplastic materials will cross-attach, and thereby adhere the flock fibers to it, which may become chemically attached thereto. Through the usage of this invention, the finished flock surface is more plush, soft, because more of the fiber is exposed and extends upwardly out of the adhesive, than with the screen-printed latex, as currently used. Also, this affords better soil release during washing or cleaning because less fiber/adhesive entanglement occurs with the flock, during application.

The use of a thermoplastic type of film for achieving adherence of a transfer to a surface, can be done either before or after the heat transferring operation, or where the heat transfer is produced. The thermoplastic film can be brought into the process at either stage, with respect to the manufacture of the transfer. It is most practical to combine the hot melt film before the heat transfer is fabricated, so it is combined in a convenient and portable manner, which operation was not possible with the previous type of application, for the thermoset film, because once the thermoset film was heated, it sets, and cannot be reheated.

In addition, it is possible to use a two-part thermoplastic type of film, such as commonly available in the industry, having different properties on each side in terms of, for example, melting point, and viscosity of structure. In this way, one can use a higher melting point holt melt film, of thermoplastic material, on the side that attaches to the flock fibers, so that the transfer is initially put together with higher heat in order to set the fibers in place, and then subsequently during application of the transfer to a textile, it may be done at a lower temperature to activate the hot melt on the substrate side while not hot enough to remelt the film holding the flock in place. Also, the hot melt holding the flock can be a very high viscosity, that is, it will not flow much when melted, in order to keep the fibers in place and not mat them together, while the film on the substrate side could be a lower viscosity type of film, that will readily flow so it will penetrate and establish a good mechanical adhesion of the transfer or grid to any substrate upon which the transfer is applied.

Thus, it is an object of this invention to provide for the development of a flock, that may be temporarily adhered onto a release film carrier, fabricated of a thermoplastic film. And, it is a further object that the hold melt film may be used as an intermediate layer, to attach the fibers to the substrate, when developing the transfer initially.

BRIEF DESCRIPTION OF THE SEVERAL VIEWS OF THE DRAWINGS

Corresponding reference numerals will be used throughout the several views of the drawings.

DESCRIPTION OF THE PREFERRED EMBODIMENT

The following detailed description illustrates the invention by way of example, and not by way of limitation. This description will enable one skilled in the art to make and use the invention, including what is presently believed is the best mode of carrying out the invention.

Figure 1:
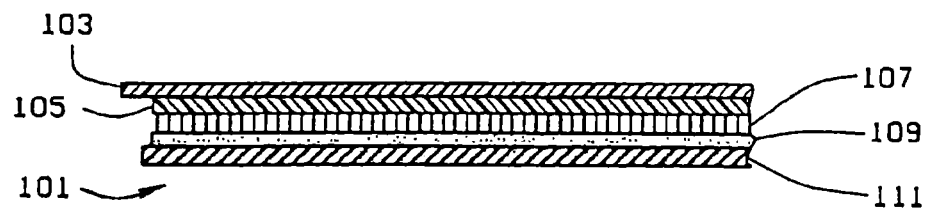
FIG. 1 is a cross-sectional view of a prior art flock transfer.

A prior art flock transfer 101 is shown in FIG. 1. As is known, such transfers include a dimensionally stable release sheet 103, to which a conventional flock transfer release adhesive 105 is applied in a pattern which corresponds to the overall image to be flocked. The flock 107 is then electrostatically coated to the release adhesive 105. A binder adhesive 109 is applied to the exposed ends of the flock to bind the flock together as a unit. Lastly, a hot melt adhesive 111 is applied. The transfer is then allowed to dry. The transfer is applied to a substrate, as is known, by positioning the transfer on a substrate, such as a shirt, coat, or other item of clothing, with the hot melt adhesive in contact with the substrate, and applying to the transfer. The heat activates the hot melt adhesive to adhere the transfer to the substrate. This process is described in my prior patent U.S. Pat. No. 4,810,549, as well as in my co-pending application, Ser. No. 09/548,839, filed Apr. 13, 2000, both of which are incorporated herein by reference.

In addition, I have described a similar transfer to that of this current invention, utilizing a thermosetting film, in my application having Ser. No. 09/621,830, filed on Jul. 24, 2000. The contents of that application are incorporated herein by reference.

Figure 2:
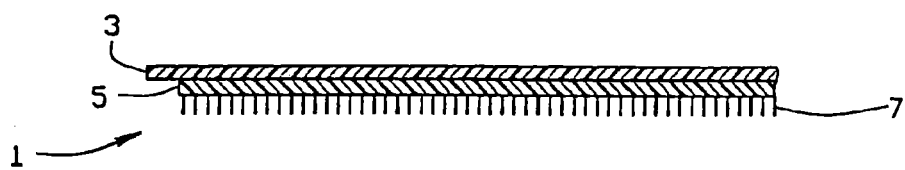
FIG. 2 is a cross-sectional view of a flock transfer of the present invention.
Figure 4:
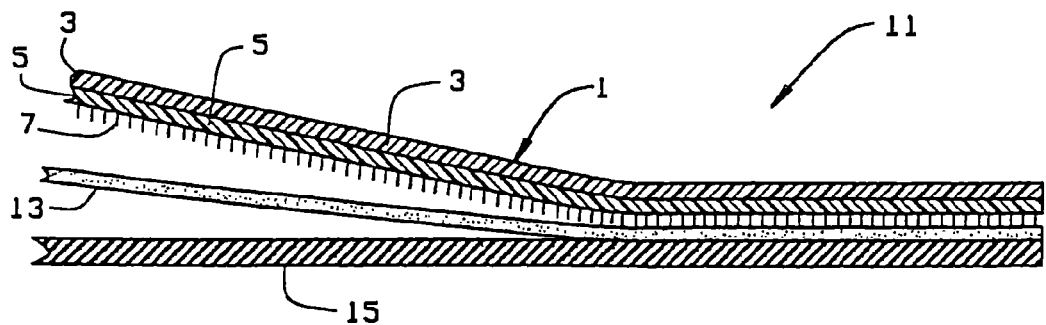
FIG. 4 is a cross-sectional view of an article of manufacture using the transfer of the present invention, showing a part of the transfer applied to part of the substrate and a part of the transfer and hot melt film spaced from the substrate.

A flocked transfer 1 of the present invention is shown in FIG. 2. The transfer 1 of the present invention includes a release sheet 3, to which a conventional release agent 5, such as a wax, or other binder, has been applied. The release agent is applied to the sheet in the shape of a pattern of the flocking. Flocking 7 is then applied to the release agent, and hence, to the release sheet, to form the transfer. The flocking 7 is applied, for example, in the manner as described in my previous patent and applications, which are incorporated herein by reference. Unlike the prior art processes, the transfer 1 is made without the use of a binder adhesive or hot melt adhesive. As is discussed below, a thermoplastic film is used to adhere the transfer to a substrate.

An article of manufacture, such as an item of clothing having a transfer 1 applied thereto, or a mouse pad, coaster, or any other numerous items having a flocked surface, can be manufactured in accordance with this invention and is easily produced using the transfer 1. Referring to FIGS. 2-5, the article of manufacture 11 is produced by positioning a hot melt sheet 13, between a substrate 15 and the flocked release sheet. The hot melt sheet is, for example, a sheet of thermoplastic polymer, comprising polyesters, and which is available from Bostik. The hot melt sheet can also be made from a thermoplastic polyurethane. Any other thermoplastic film should also work well. The substrate 15 can be item of clothing, a rubber pad (as for example, for producing a mouse pad or coaster), etc. The hot melt sheet can be precut to correspond to the shape of the transfer. The transfer 1 is then positioned on the hot melt sheet with the flock 7 against the hot melt sheet 13. Heat is applied to the transfer through the release sheet to activate the hot melt sheet. The hot melt sheet then acts to both bind the flock 7 together and to generally permanently adhere the flock 7 to the substrate 15. Preferably, to assemble the article, the flocked release sheet, the thermoplastic film, and the substrate are brought together and passed through a heat laminating press where the three parts are subject to a temperature of about 300° F. to 350° F. (generally in excess of 150° C.) and pressure (about 40-50 psi) for about 30 seconds. It has been found that a medium-to-firm pressure has been most advantageous in providing for assembly of this type of plush flocked transfer. The pressure and heat will cause the hot melt to adhere to the flock and the substrate. Additionally, the hot melt film will physically adhere or cure, to give a strong attachment of the flock to the substrate.

The basic premise of this application in utilizing a thermoplastic film which will semi-cure, after heat has been used to apply the transfer to a substrate, is that after heat application, if the temperature of the transfer does not rise to a particular heat level, it should not remelt again. In other words, the object is to use a hot melt film which has a melting point significantly high enough, so that when the transfer is applied through heat, it will adhere to the substrate, but that when the transfer and the substrate to which it is applied is not exposed to excessive heat, it will not remelt, even through the polymer film is thermoplastic, and for all practical purposes, in actual usage, the film will not remelt since it does not see those high temperatures again. In other words, if the melting point of the thermoplastic film is 350° F., and the top temperature that the flocked finished product will encounter, for example sunlight in a hot car, is only 250° F., then there is not a problem associated with the fact that the film is a thermoplastic and therefore can theoretically melt again, but only if it encounters those excessive temperatures.

Another attribute of the use of a thermoplastic film is that in the event one desires to remove the flocked transfer from, for example, an item of clothing, subjecting the transfer to those elevated temperatures, again, will allow the flock to be removed, if that is a need of the owner.

Figure 3:
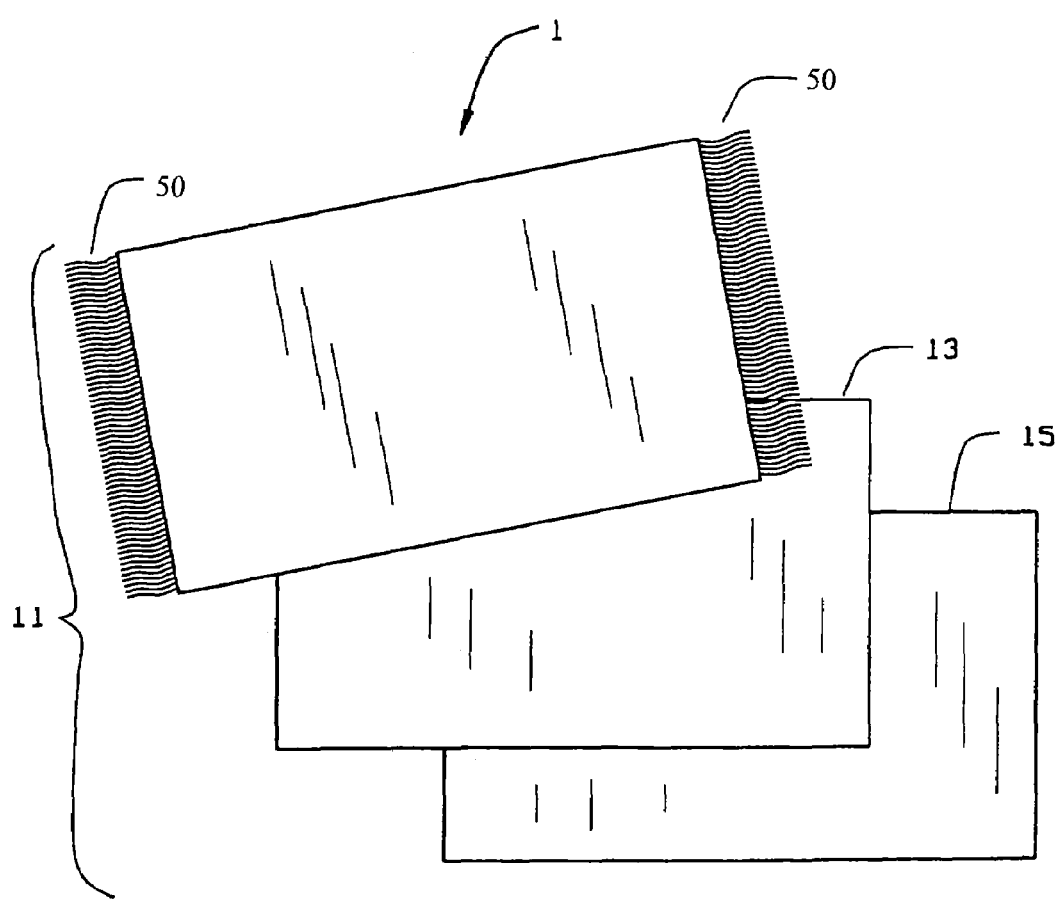
FIG. 3 is an exploded view of the transfer, a hot melt sheet, and a substrate used to make an article of manufacture.
Figure 5:
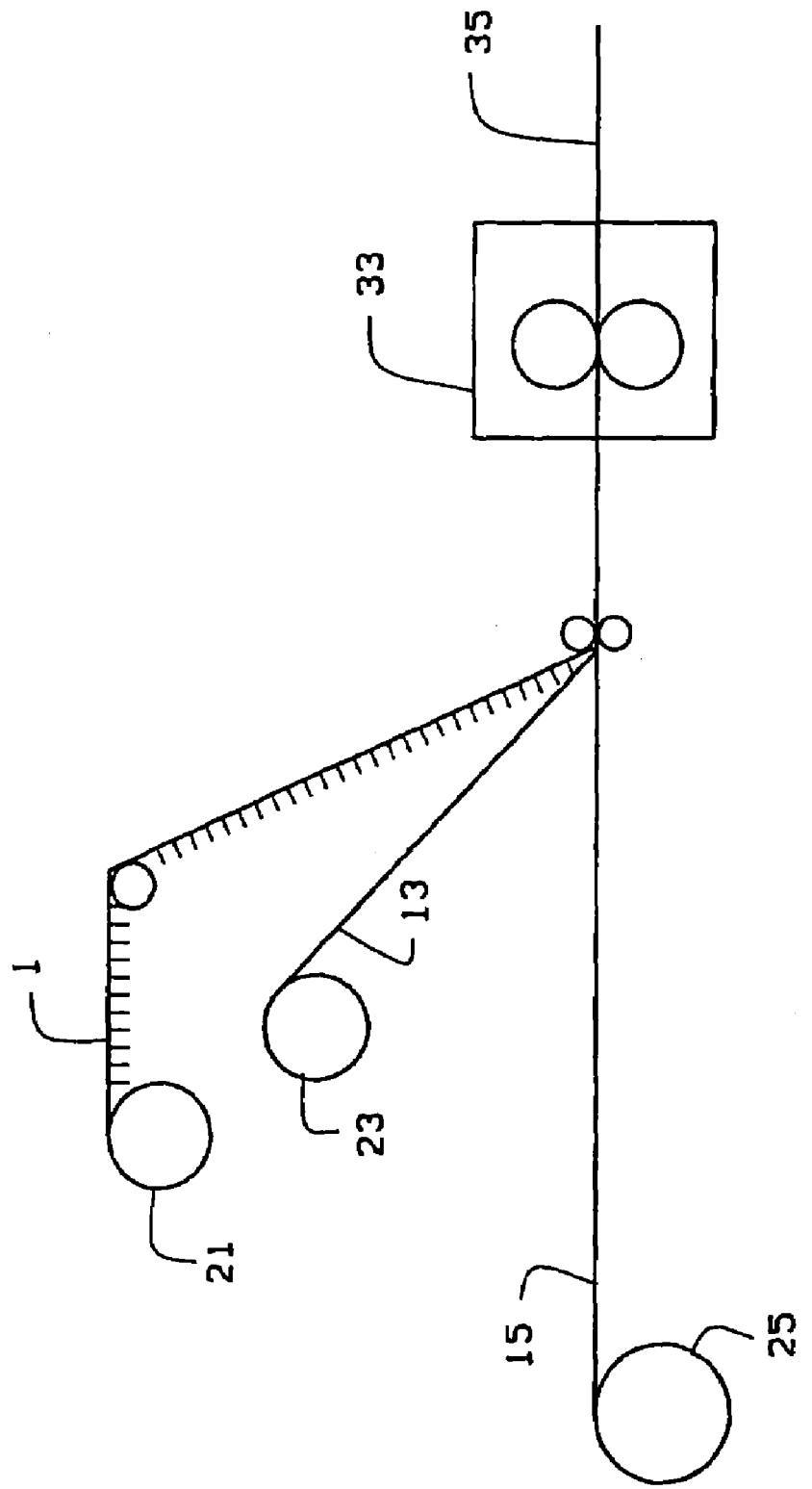
FIG. 5 is a schematic drawing of a process for continuously producing articles of manufacture, such as mouse pads, coasters, transfers for application to clothing, etc.

Articles, such as mouse pads or coasters, in which the entire top surface of the article is covered with the flocking can be produced on a continuous basis, as shown in FIGS. 3 and 5. Rolls 21, 23 and 25, of the flocked release sheet 1, the thermoplastic hot melt film 13, and the substrate 15, are provided. The three parts are brought together at a lamination station 33. Rollers can be provided in front of the station 33 so that the three elements are adjacent each other as they enter the lamination station. In the lamination station, heat and pressure are applied to the three sheets (the flocked release sheet, the hot melt film, and the substrate) to melt the hot melt film. The melted hot melt film will then cure or cross-link, as noted above, to adhere the flock to the substrate. A web 35 exits the laminating station. The web 35 is then allowed to cool. The web 35 is ultimately directed to a cutting station where it is cut into individual articles. Once the web 35 is cooled, it can be directed immediately to a cutting station (after the sheet 35 cools), or it can be wound up on an uptake roller to be cut into individual articles at a later time, or at a different location. At the cutting station, the release sheet is removed from the flock and gathered on a take-up roll or is otherwise disposed of. After the release sheet has been removed from the flock, the substrate with flock adhered thereto is cut to form the articles 11. It is also likely that one could remove the release liner either before or after the die cutting procedure. As shown in FIG. 3, a fringe material 50 can be applied to peripheral edges of the flocked release sheet 1 or substrate 15 during this manufacturing process.

Preferably the release sheet is flocked and supplied in roll form as shown in FIG. 5. However, the flocking of the release sheet could be made part of the process.

To produce flocked articles, such as shirts, jackets, sports bags, etc., which cannot be easily flocked on a continuous basis, the hot melt sheet can be applied to the transfer 1 prior to applying the transfer to the substrate. To do this, the thermoplastic hot melt film is placed in contact with the flock of the transfer, and the transfer and release sheet are heated to a temperature at which the thermoplastic hot melt film becomes tacky, but below the temperature at which the thermoplastic hot melt film begins to cure or physically adhere. This will adhere the thermoplastic hot melt film to the transfer 1 to form a transfer which can later be applied to an article by positioning the transfer with the hot melt film in position on the article (i.e., a piece of clothing) and applying heat and pressure to the transfer, for example, with an iron, sufficient to melt the hot melt film, to cause the hot melt film to somewhat cure or physically adhere, to adhere the flock, and secure to the clothing.

The method eliminates two steps from the prior art method: (1). Application of the binder adhesive, and (2) application, cleaning, sintering, and drying of the hot melt adhesive. In a continuous process, the present method also eliminates a station for applying the binder of hot melt adhesives as well as a station for drying the completed transfer. Because the station is not needed to apply (i.e., print) the binder and hot melt adhesives are applied to the flocking as part of the transfer, the machinery required to produce the article 11 is much less expensive (both in actual cost and in maintenance cost). Additionally, because the binder adhesive and hot melt adhesive is not used, the cost of the article of manufacture is reasonably reduced.

It is conceivable in the performance of the manufacture of the transfer of this invention, that the thermoplastic film may be a dual laminated type of film. For example, the upper surface may include a polyester type of film, that may have a melting point at a higher temperature. The lower film, laminated thereto, may be a polyethylene type of film, designed to have a lower temperature melting point. Hence, when the flock is applied to the upper surface of the laminated film, it will embed slightly into that film when heated, and the flock is electrostatically or otherwise applied, and while the bottom surface of the laminated film may likewise soften, once the transfer is cooled, all the films will become structurally sound, once again, in a film structure. Then, when a lower heat is applied to the transfer, for application of the transfer to a textile, rubber, or other surface, as when the transfer is being applied, the bottom polyethylene or EVA film will slightly soften, or melt, to function as an adhesive, for application of the entire transfer to its supporting substrate or surface. This is an example as to how the thermoplastic film(s) of this invention can be used not only for constructing of the transfer, but to function in a dual manner to allow for the application of the transfer to a shirt, bag, or other material, during its final application.

Another one of the advantages of utilization of thermoplastics, in the fabrication of flocked transfers, is that the binder adhesives previously used in the flocking process, typically contain an acrylic, or other materials, which may be flammable. Thermoplastics avoid that predicament. Furthermore, the thermoplastic type binder exhibits wash fastness, and will hold the flock in place even during severe washing conditions.

Furthermore, thermoplastic films exhibit better elasticity, than can be obtained from the thermoset or other binder hot melt systems now in use. In addition, the use of the film provides a thinner profile for the finished product, providing a less bulky type of flock transfer, both visually and structural wise, when applied to a garment or other textiles. For example, flock transfers made in accordance with this invention can even be used upon sheer garment textiles. The usage of the thermoplastic film of this invention, avoids the necessity for application of binders, as previously used, and which contain formaldehyde or other undesired chemicals, as used in previous adhesives to achieve cross linking for flocking purposes in the prior art. There are other miscellaneous film properties that are enhanced through the usage of thermoplastic films, versus the usage of the binder-hot melt powder combination, because there are films that have performance characteristics that cannot be obtained nor are they available for the binder-powder systems. For example, adhesions to leather, or other tough-to-stick-to-surfaces, that exhibit greater tensile strength, such as stretching that will not split, can be better accommodated through the usage of thermoplastic film.

Variations or modifications to the subject matter of this invention may occur to those skilled in the art upon reviewing the invention as described herein. Such variations, if within the scope of this invention, are intended to be encompassed within the claims to issue upon the invention of this application. The description of the preferred embodiment, as shown in the drawings, is set forth for illustrative purposes only.

The invention claimed is:

1. A method, comprising:
   (a) providing a flocked release sheet, comprising flock fibers, a release sheet, a release adhesive adhered to the release sheet, and a plurality of flock fibers, with the flock fibers being adhered to the release sheet by the release adhesive;
   (b) thereafter contacting the flock fibers with a pre-formed, solid, and self-supporting dual laminated film having first and second portions, with the flock fibers being substantially perpendicular to an adjacent surface of the pre-formed, solid, and self-supporting dual laminated film and the flock fibers being positioned between the release sheet and release adhesive one hand and the pre-formed, solid, and self-supporting dual laminated film on the other, wherein the flock fibers are positioned on the first portion; and
   (c) while the flocked release sheet is in contact with the pre-formed, solid, and self-supporting dual laminated film, heating and applying pressure to the pre-formed, solid, and self-supporting dual laminated film to soften at least the first portion and adhere the pre-formed, solid, and self-supporting dual laminated film to the flock fibers and form an article of manufacture.

2. The method of claim 1, wherein the first and second portions have differing chemical compositions.

3. The method of claim 2, wherein the first portion comprises a polyester and the second portion comprises at least one of a polyethylene and ethylene vinyl acetate.

4. The method of claim 1, wherein the first and second portions have differing properties.

5. The method of claim 4, wherein the first and second portions have differing melting points.

6. The method of claim 5, wherein the second portion is in contact with a substrate and wherein the first portion has a higher melting point than the second portion.

7. The method of claim 4, wherein the first and second portions have differing viscosities.

8. The method of claim 7, wherein the first portion is in contact with the flock fibers and wherein the second portion is in contact with a substrate and wherein the first portion has a higher viscosity than the second portion.

9. The method of claim 1, wherein the first portion comprises a polyester and wherein at least most of the flock is in direct contact with the first portion.

10. The method of claim 1, wherein the ends of the flock fibers are embedded in the first portion.

11. A method, comprising:
  (a) providing a flocked release sheet, comprising flock fibers, a release sheet, a release adhesive adhered to the release sheet, and a plurality of flock fibers, with the flock fibers being adhered to the release sheet by the release adhesive;
  (b) thereafter contacting the flock fibers with a pre-formed, solid, and self-supporting thermoplastic adhesive film, the pre-formed, solid, and self-supporting thermoplastic adhesive film having first and second portions, the first portion being in contact with the flock fibers, wherein the first and second portions have at least one different property; and
  (c) while the flocked release sheet is in contact with the pre-formed, solid, and self-supporting thermoplastic adhesive film, heating and applying pressure to the pre-formed, solid, and self-supporting thermoplastic adhesive film to embed the flock fibers in the first portion and to adhere the pre-formed, solid, and self-supporting thermoplastic adhesive film to the flock fibers and form an article of manufacture.

12. The method of claim 11, wherein the pre-formed, solid, and self-supporting thermoplastic adhesive film is a dual laminated film.

13. The method of claim 11, wherein the different property is chemical composition.

14. The method of claim 13, wherein the first portion comprises a polyester and the second portion comprises at least one of a polyethylene and ethylene vinyl acetate.

15. The method of claim 11, wherein the first and second portions have differing melting points.

16. The method of claim 15, wherein the first portion has a higher melting point than the second portion.

17. The method of claim 11, wherein the first and second portions have differing viscosities.

18. The method of claim 17, wherein the first portion has a higher viscosity than the second portion.

19. A method of producing a flocked transfer comprising:
  (a) supplying a flocked release sheet comprising flock fibers, a release sheet, and a release adhesive adhering the flock fibers to the release sheet;
  (b) supplying a pre-formed, solid, and self-supporting dual laminated adhesive sheet having first and second portions, wherein the first and second portions have different chemical compositions;
  (c) thereafter contacting the flocked release sheet with the first portion;
  (d) while the first portion is in contact with flocked release sheet, heating and applying pressure to the pre-formed, solid, and self-supporting dual laminated adhesive sheet to soften at least the first portion and embed the flock fibers into the pre-formed, solid, and self-supporting dual laminated adhesive sheet, thereby providing a flock transfer comprising the flocked release sheet and pre-formed, solid, and self-supporting dual laminated adhesive sheet.

20. The method of claim 19, wherein the pre-formed, solid, and self-supporting dual laminated adhesive sheet is a thermoplastic adhesive.

21. The method of claim 19, wherein the first portion comprises a polyester and the second portion comprises at least one of a polyethylene and ethylene vinyl acetate.

22. The method of claim 19, wherein at least one of the following is true:
  (i) the first and second portions have differing melting points; and
  (ii) the first and second portion have differing viscosities.

23. The method of claim 19, wherein at least one of the following is true:
  (i) the first portion has a higher melting point than the second portion; and
  (ii) the first portion has a higher viscosity than the second portion.

24. The method of claim 23, wherein (i) is true.

25. The method of claim 23, wherein (ii) is true.

26. The method of claim 23, wherein both (i) and (ii) are true.

27. The method of claim 19, wherein the second portion is in contact with a substrate.

28. The method of claim 19, wherein the pre-formed, solid, and self-supporting dual laminated adhesive sheet has a substantially uniform thickness.

29. The method of claim 19, wherein there is no binder adhesive in contact with the pre-formed, solid, and self-supporting dual laminated adhesive sheet and wherein the heating and applying pressure steps are preformed substantially in the absence of a binder adhesive positioned between the pre-formed, solid, and self-supporting dual laminated adhesive sheet and the flock.

30. The method of claim 19, wherein at least most of the flock is in direct contact with the first portion.

* * * * *